US012236189B2

(12) United States Patent
Cogley et al.

(10) Patent No.: US 12,236,189 B2
(45) Date of Patent: Feb. 25, 2025

(54) PERSONALIZED TEXT PROOFING USING DISTRIBUTED SERVICES

(71) Applicant: Microsoft Technology Licensing, LLC, Redmond, WA (US)

(72) Inventors: James Aidan Cogley, Dublin (IE); Enrico Cadoni, Dublin (IE); Colin Laird, Dublin (IE); Shashank Shekhar Gupta, Dublin (IE); Olivier Gauthier, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 454 days.

(21) Appl. No.: 17/502,933

(22) Filed: Oct. 15, 2021

(65) Prior Publication Data

US 2023/0124709 A1    Apr. 20, 2023

(51) Int. Cl.
*G06F 40/232* (2020.01)
*G06F 40/166* (2020.01)
*G06F 40/253* (2020.01)

(52) U.S. Cl.
CPC .......... *G06F 40/232* (2020.01); *G06F 40/166* (2020.01); *G06F 40/253* (2020.01)

(58) Field of Classification Search
CPC ..... G06F 40/232; G06F 40/253; G06F 40/166
See application file for complete search history.

(56) References Cited

U.S. PATENT DOCUMENTS

| 2002/0010726 | A1* | 1/2002 | Rogson | G06F 40/232 715/257 |
| 2018/0032499 | A1* | 2/2018 | Hampson | G06F 40/232 |
| 2018/0188824 | A1* | 7/2018 | Dunne | G06F 3/0237 |
| 2020/0379755 | A1* | 12/2020 | Boada | G06F 40/232 |

FOREIGN PATENT DOCUMENTS

WO    2021055102 A1    3/2021

OTHER PUBLICATIONS

"International Search Report and Written Opinion Issued in PCT Application No. PCT/US22/041434", Mailed Date: Nov. 28, 2022, 9 Pages.

* cited by examiner

*Primary Examiner* — Pierre Louis Desir
*Assistant Examiner* — Daniel W Chung
(74) *Attorney, Agent, or Firm* — Schwegman Lundberg & Woessner, P.A.

(57) ABSTRACT

Systems and methods are directed to providing personalized text proofing. A user model that is used to personalize generic critiques for text proofing a document is generated based on user signals indicating past user actions. During runtime of an application used to create the document, the user model is accessed and locally cached. User inputs comprising typed components used to create the document are received and a set of one or more generic critiques for the user inputs is accessed from an editor system. The user model is applied to the set which may modify a generic critique of the set. The modifying of the generic critique can cause the generic critique to be automatically applied or suppressed at the client device. The set including the modified generic critique is transmitted to a user device, whereby the user device applies the set to the document including automatically applying or suppressing the modified generic critique.

18 Claims, 7 Drawing Sheets

PERSONALIZED TEXT PROOFING USING DISTRIBUTED SERVICES

TECHNICAL FIELD

The subject matter disclosed herein generally relates to text proofing. Specifically, the present disclosure addresses systems and methods that provides personalized text proofing using distributed services.

BACKGROUND

Conventional, an editor service provides users an ability to receive spelling and grammar suggestions (collectively referred to as "critiques") to enhance content the users are drafting. The editor service can process billions of requests daily often with a high level of repetitive events occurring. For example, common spelling mistakes or common patterns (e.g., "Hi <unique name>") generate false flags. Additionally, when creating a document, users typically repeat similar actions (e.g., correcting or ignoring the same errors). This creates a significant cognitive burden on users that see the same incorrect flags or perform the same repetitive actions on correct flags.

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

When creating documents using an application that provides editing services, users may be presented with generic spelling and grammar suggestions ("generic critiques") that may be general to, for example, an application, region, or language. However, some generic critiques may be consistently rejected or consistently accepted by users or group of users (e.g., of a tenant). Repeatedly presenting generic critiques that are consistently rejected becomes a nuisance for the users and may affect computing resources. Similarly presenting generic critiques that are consistently accepted (e.g., the user actively accepted by performing an action such as selecting an icon) can also be annoying to the user.

Example embodiments analyze signals representing user actions (e.g., active rejections and acceptance) with respect to previous text proofing suggestions or critiques to anticipate future user actions and reduce repetitive user actions (e.g., automatically correct or ignore). For example, user and tenant-specific words that are often accepted by a given user may be automatically corrected by the system. Additionally, the system can automatically recognize words that are specific to the user and does not produce a false-flag critique. The system may also discover and provide feedback to the user on critiques that they may want to turn on or off.

As a result, one or more of the methodologies described herein facilitate solving the technical problem of personalizing text proofing using heuristics and/or machine learning. Specifically, user models (also referred to as "personalization models") are generated that are utilized at runtime to override generic (or tenant level) proofing suggestions or critiques. With high confidence, some personalized proofing changes can occur automatically, while other frequently ignored proofing suggestions are automatically suppressed. As such, one or more of the methodologies described herein may obviate a need for certain efforts or computing resources that otherwise would be involved, for example, in repeatedly presenting suggestions that are consistently accepted or ignored. Examples of such computing resources include processor cycles, network traffic, memory usage, data storage capacity, power consumption, network bandwidth, and cooling capacity.

Figure 1:
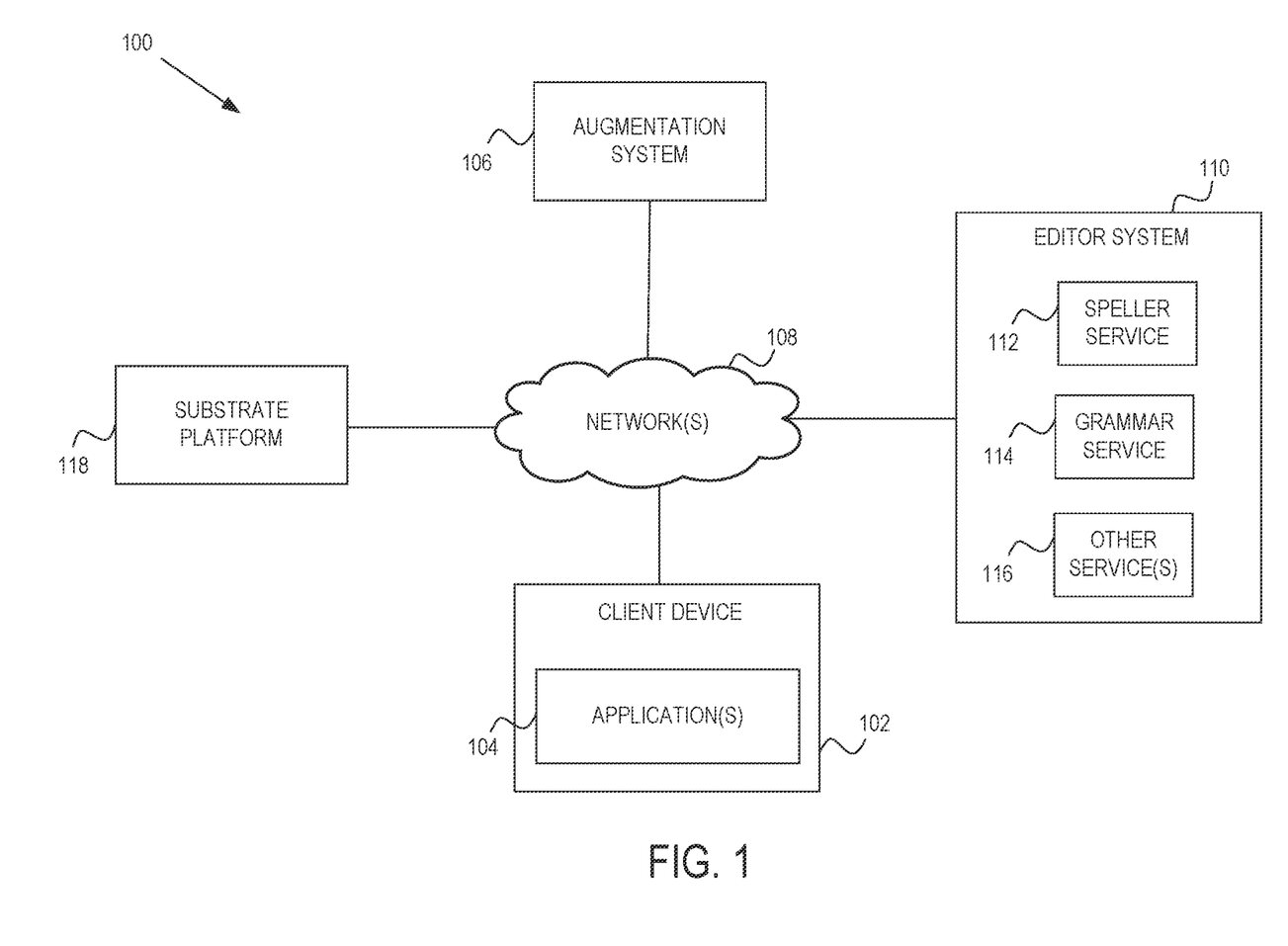
FIG. 1 is a diagram illustrating a network environment suitable for providing personalized text proofing, according to some example embodiments.

FIG. 1 is a diagram illustrating a network environment 100 suitable for providing personalized text proofing, in accordance with example embodiments. In example embodiments, a client device 102 is a device of a user who is using one or more applications 104 thereon to generate and/or edit a document. For example, the client applications 104 can include a word processing application, a spreadsheet application, a presentation application, or an email application. The applications 104 can be running locally at the client device 102 or be web-based (e.g., part of Microsoft Office 365).

The client device 102 may comprise, but is not limited to, a smartphone, tablet, laptop, multi-processor systems, microprocessor-based or programmable consumer electronics, game consoles, set-top boxes, a server, or any other communication device that can generate documents and can access the network 108.

While interacting with the document, various proofing suggestions or critiques are presented on the client device 102. In example embodiments, the client device 102 interfaces with an augmentation system 106, via a connection with a network 108, to receive the proofing critiques. Depending on the form of the client device 102, any of a variety of types of connections and networks 108 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 108 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 108 is a Wireless Fidelity (Wi-Fi, IEEE 802.11x type) connection, a Worldwide Interoperability for Microwave Access (WiMAX) connection, or another type of wireless data connection. In some embodiments, the network 108 includes one or more wireless access points coupled to a local area network (LAN), a wide area network (WAN), the Internet, or another packet-switched data network. In yet another example, the connection to the network 104 is a wired connection (e.g., an Ethernet link) and the network 108 is a LAN, a WAN, the Internet, or another packet-switched data network. Accordingly, a variety of different configurations are expressly contemplated.

The augmentation system 106 provides personalized proofing functionality via the communication network 108 (e.g., the Internet, wireless network, cellular network, or a Wide Area Network (WAN)) to the client device 102. During runtime, the augmentation system 106 accesses (e.g., receives, retrieves) user inputs (e.g., text) that a user is typing into the document and forwards the user input to an editor system 110 in accordance with some embodiments. The editor system 110 analyzes the user input using one or more of a speller service 112, a grammar service 114, or other proofing services 116 (e.g., synonym service). The speller service 112 provides spelling suggestions. In some cases, the spelling suggestion may be customized based on, for example, region or language. The grammar service 114, provides various grammar suggestions such as, for example, suggestions on capitalization, subject verb agreement, hyphen use, indirect questions, misheard phrases, and commonly confused phrases. In some cases, the grammar suggestions may be customized based on, for example, regions and language.

Subsequently, the augmentation system 106 accesses (e.g., receives, retrieves) a set of generic critiques (e.g., a set of one or more spelling and grammar suggestions) from the editor system 110. The critiques may be general to all users (e.g., are not customized or personalized critiques).

The augmentation system 106 also accesses (e.g., receives, retrieves) a personalization model (also referred to as a "user model") from a substrate platform 118. The personalization model may be for the user or a tenant of which the user is a part of. The personalization model is then applied to the set of generic critiques, by the augmentation system 106, which may modify (e.g., personalize) one or more of the generic critiques. The modified set of critiques are then presented to the user on the client device 102. The augmentation system 106 will be discussed in more detail in connection with FIG. 3 below.

The user can choose to actively ignore a critique (e.g., select an ignore button) or accept the critique. The action of actively ignoring or accepting the critique is stored to the substrate platform 118 as a user signal. At a predetermine time (e.g., every 24 hours) or predetermined event (e.g., when a predetermined amount of signals are aggregated), the user signals are processed by the substrate platform 112 and the personalization model updated. In some embodiments, the processing involves the use of heuristics and statistics, while in other embodiments, the processing is by machine learning. The substrate platform 118 will be discussed in more detail in connection with FIG. 2 below.

In example embodiments, any of the systems, servers, platforms, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 or their functionality (e.g., the functionalities of the augmentation system 106, the editor system 110, the substrate platform 118) may be combined, or the functions described herein for any single component may be subdivided among multiple components. Additionally, any number of client devices 102 may be embodied within the network environment 100. While only a single augmentation system 106, editor system 110, and substrate platform 118 are shown, alternative embodiments contemplate having more than one augmentation system 106, editor system 110, or substrate platform 118 to perform the operations discussed herein (e.g., each localized to a particular region).

Figure 2:
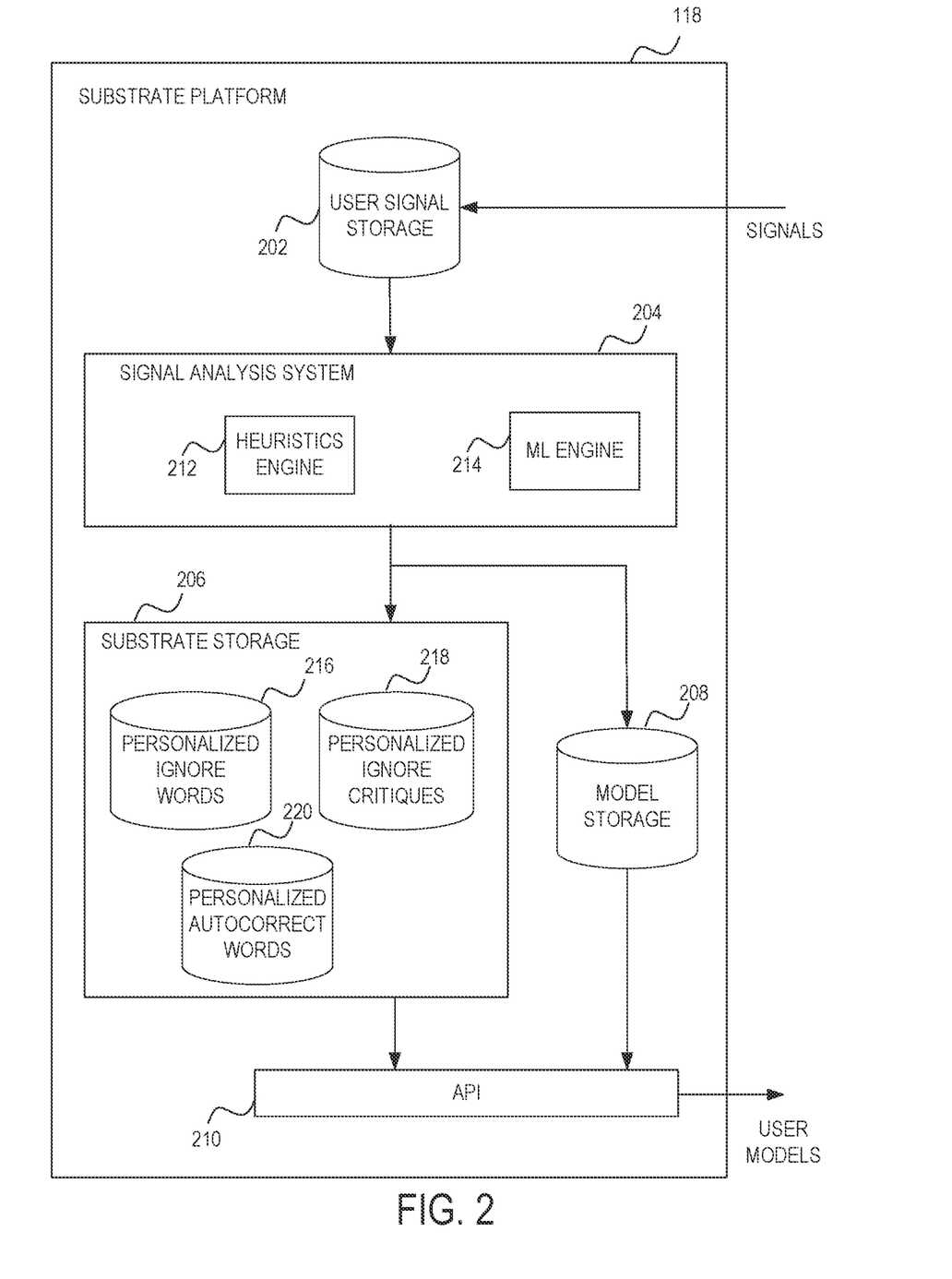
FIG. 2 is a diagram illustrating a substrate platform that performs signal processing and analysis, according to some example embodiments.

FIG. 2 is a diagram illustrating components of the substrate platform 118, according to some example embodiments. In example embodiments, the substrate platform 118 performs offline processing of user signals to generate user models and provides access to these user models during runtime. The user models may include or utilize lists/maps of personalized ignored words, personalized ignored critiques, and personalized autocorrect words. As such, the substrate platform 118 comprises a user signal storage 202, a signal analysis system 204, a substrate storage 206, and a model storage 208 all communicatively coupled together (e.g., via a bus). The substrate platform 118 may also comprise an application program interface (API) 210. The API 210 is an interface that allows access to the models by the augmentation system 106.

The user signal storage 202 aggregates the user signals (e.g., received via the augmentation system 106). The user signals comprise active ignores and accepts of critiques (e.g., both generic and modified) provided to the user at the client device 102. In some embodiments, the critiques include spelling suggestions and grammar suggestions. In further embodiments, the critiques can include other suggestions from the editor system 110 and/or modified critiques by the augmentation system 106. The user signals may be stored in a user shard.

The signal analysis system 204 analyzes the user signals to derive user models. In some embodiments, the analysis involves the use of heuristics and statistics, while in other embodiments, the analysis involves machine learning. As such the signal analysis system 204 comprises a heuristics engine 212 and a machine learning engine 214.

In some embodiments, the signal analysis system 204 analyzes the user signals based on various properties such as culture tag, flagged text, replacement text, sentence, and list suggestions. The culture tag property indicates a language of the user input text. This property allows for customization based on language of the user.

The flagged text property is the user typed component or text that is flagged, for example, by the editor system 110. The flagged text is the "typed" (or user inputted) component or text of a typed/meant pair.

The replacement text is the suggested text (e.g., suggested by the editor system 110) that replaces the user inputted text when the user accepts the suggested text. In the typed/meant pair, the replacement text is the "meant" component or text. If the signal analysis system 204 determines that this replacement component occurs a threshold amount or percentage of times in conjunction with a same flagged text, this action can be personalized and/or automatically applied.

The sentence property comprises context of the flagged text to a sentence boundary (e.g., a locale). The sentence property can inform future scenarios to ensure that, for example, the editor system 110 is more intelligent in leveraging contextual signals.

The list suggestions comprise a suggestion list presented to the user. In various embodiments, the suggestion list allows for further contextualization of actions such as suggestion reranking.

In example embodiments, the heuristics engine 212 is configured to use heuristics and statistics to derive personalized lists that collectively represent a user model that is accessed at runtime by the augmentation system 106. In a simplest embodiment, the heuristics engine 212 accesses the user signals and determines for each typed/meant pair a frequency that a user accepts (or rejects) the suggestion. If the acceptance frequency (or percentage) transgresses a frequency threshold, the typed/meant pair suggestion may be automatically applied (e.g., the "typed" component is automatically corrected to the "meant" component). In some cases, if the rejection frequency transgresses a second frequency threshold, the typed/meant pair suggestion may be automatically suppressed.

In a more complex embodiment, tenant models may be utilized. Here, the heuristic engine 212 analyzes user signals for a particular tenant (e.g., grouping of users) and determines for each typed/meant pair a frequency that users in the tenant accepted or rejected the suggestion. A confidence in the typed/meant pair may be calculated, as will be discussed further below. In various embodiments, if confidence is high (e.g., equal to or greater than 95%) or frequency for the tenant is high (e.g., equal to or greater than 1000), the typed/meant pair suggestion may be automatically applied (or suppressed). In some cases, an individual user's frequency is also tracked. Thus, if the user's frequency exceeds a predetermined threshold (e.g., equal to or greater than 100), then the typed/meant pair suggestion may also be automatically applied (or suppressed).

The results of the analysis performed by the heuristics engine 212 are stored to the substrate storage 206. In example embodiments, the substrate storage 206 comprises data storage of lists/maps that form a user model for use during runtime. The substrate storage 206 may include a personalized ignore words storage 216, a personalized ignore critiques storage 218, and a personalized autocorrect words storage 220. The personalization may be specific to a tenant (also referred to herein as a "user" or "tenant user"), a user, or a combination of both.

The personalized ignored words storage 216 stores a mapping of words for which a user has actively ignored spelling critiques (e.g., selected "ignore"). In example embodiments, the mapping of words associates the flagged text (e.g., typed component) with the meant component (e.g., meant component) in the mapping in the personalized ignored words storage 216. In embodiments where confidence is high for a typed/meant pair, a spelling critique for the typed/meant pair is automatically suppressed.

Similarly, the personalized ignore critiques storage 218 stores a mapping of words associated with grammar critiques or non-speller critiques that are actively ignored. In example embodiments, the mapping of words associates the flagged text (e.g., typed component) with the suggested grammar replacement (e.g., meant component) in the mapping in the personalized ignored critique storage 218. In embodiments where confidence is high for a typed/meant pair, a grammar critique for the typed/meant pair is automatically suppressed. While example embodiments discuss identifying and storing actively ignored grammar critiques, an alternative embodiment may, additionally or alternatively, identify and store actively accepted grammar critiques.

The personalized autocorrect words storage 220 stores a mapping of words that that should be automatically corrected. In example embodiments, the mapping of words associates the flagged text (e.g., typed component) with the meant component (e.g., replacement text) in the mapping in the personalized autocorrect words storage 220 such that the flagged text is automatically replaced with the replacement text for the user.

The machine learning engine 214 is configured to machine-train models that are used by the augmentation system 106 to personalize critiques. In example embodiments, the training involves using spelling and grammar critiques that are normally accepted or rejected by a user to identify patterns that will trigger automatic correction or suppression of generic critiques suggested by the editor system 110. More specifically, the machine learning engine 214 takes, as input, the user signals from the user signal storage 202. Using these inputs, the machine learning engine 214 determines patterns with respect to the critiques that are accepted or rejected. For example, the machine learning engine 214 extracts properties from the user signals (e.g., culture tag, flagged text, replacement text, sentence, and list suggestions) and uses these properties along with indications as to whether the critiques were accepted or ignored, as features to train a machine learning model for a user or a tenant. The machine learning model is then stored to the model storage 208.

Figure 3:
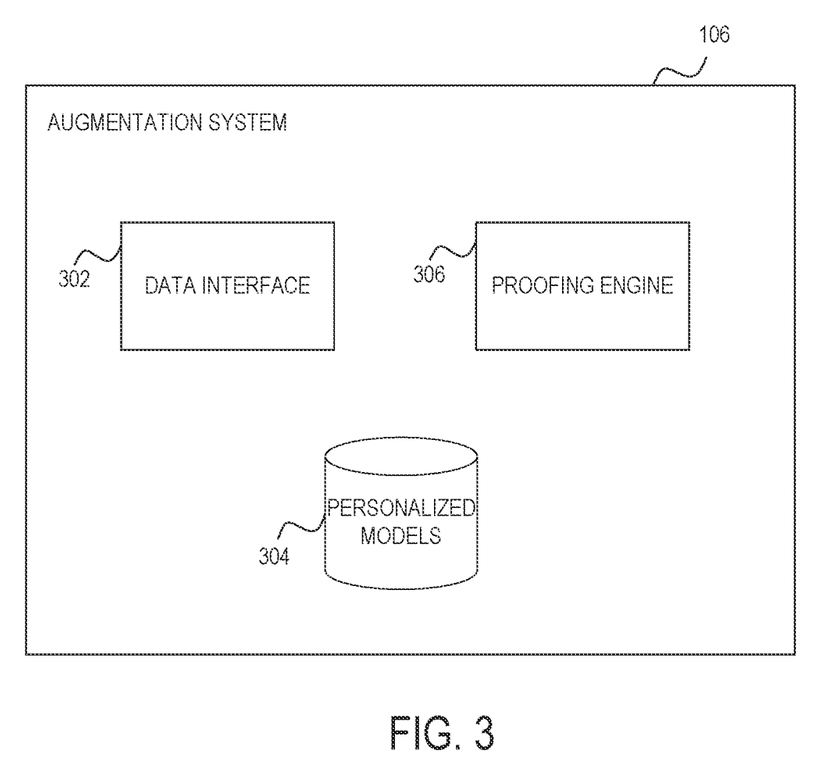
FIG. 3 is a block diagram illustrating components of an augmentation system that facilitates personalized text proofing, according to some example embodiments.

Referring now to FIG. 3, a block diagram illustrating components of the augmentation system 106 is shown. In example embodiments, the augmentation system 106 applies the user models accessed from the substrate platform 118 to generic critiques accessed from the editor system 110 to provide personalized text proofing to the user. To enable these operations, the augmentation system 106 comprises a data interface 302, a personalized models storage 304, and a proofing engine 306 all communicatively coupled together (e.g., via a bus).

The data interface 302 is configured to exchange data with various components in the environment 100. In some embodiments, the data interface 302 accesses a user model from the substrate platform 118. In some embodiments, the retrieval is upon client device 102 startup of an application (e.g., applications 104) that provides proofing service. For instance, the data interface 302 receives a user token from the client device 102. Using the user token, the augmentation system 106 retrieves the corresponding user model from the substrate platform 118. In some cases, the data interface 302 makes a call to the API 210 of the substrate platform 188. In response, the user model (e.g., a set comprising personalized NGrams or typed/meant pairs from the substrate storage 206 or the machine learning model from the model storage 208) is received and locally cached in a service session in the personalized models storage 304.

Advantageously, the proofing system (e.g., combination of the augmentation system 106 and editor system 110) is configured to operate in both a web-based embodiment and a client-based (e.g., Win32) embodiment without modification of the backend (e.g., the substrate platform 118). Further still, the proofing system is extensible to different model/data types and not isolated to a particular type/framework.

If the architecture of the client device 102 is web-based, then the proofing engine 306 of the augmentation system 106 provides the personalized proofing. Specifically, the proofing engine 306 acts as an intermediate between the client device 102 and the editor system 110. In example embodiments, the proofing engine 306 receives the user text inputs. The proofing engine 306 then calls the editor system 110 to obtain a set of generic critiques (e.g., provides the user text inputs to the editor system 110). The proofing engine 306 then applies the retrieved user model to the set which may modify one or more of the generic critiques in the set. The modified set of critiques (e.g., a set which may include generic and modified critiques) are then sent to the client device 102. The modified set of critiques may include autocorrections. For example, a spelling correction that is frequently accepted by the user may be automatically applied based on the modified critique.

If the architecture of the client device 102 allows for the client-based embodiment, then the client device 102 downloads contents of the proofing service locally, assuming the client device 102 meets CPU and memory requirements. For instance, the data interface 302 can provide a copy of the user model to the client device 102 which locally caches the user model. The client device 102 can then generate the generic critiques and run the user model(s) (e.g., apply the user models to the generic critiques) locally.

Figure 4:
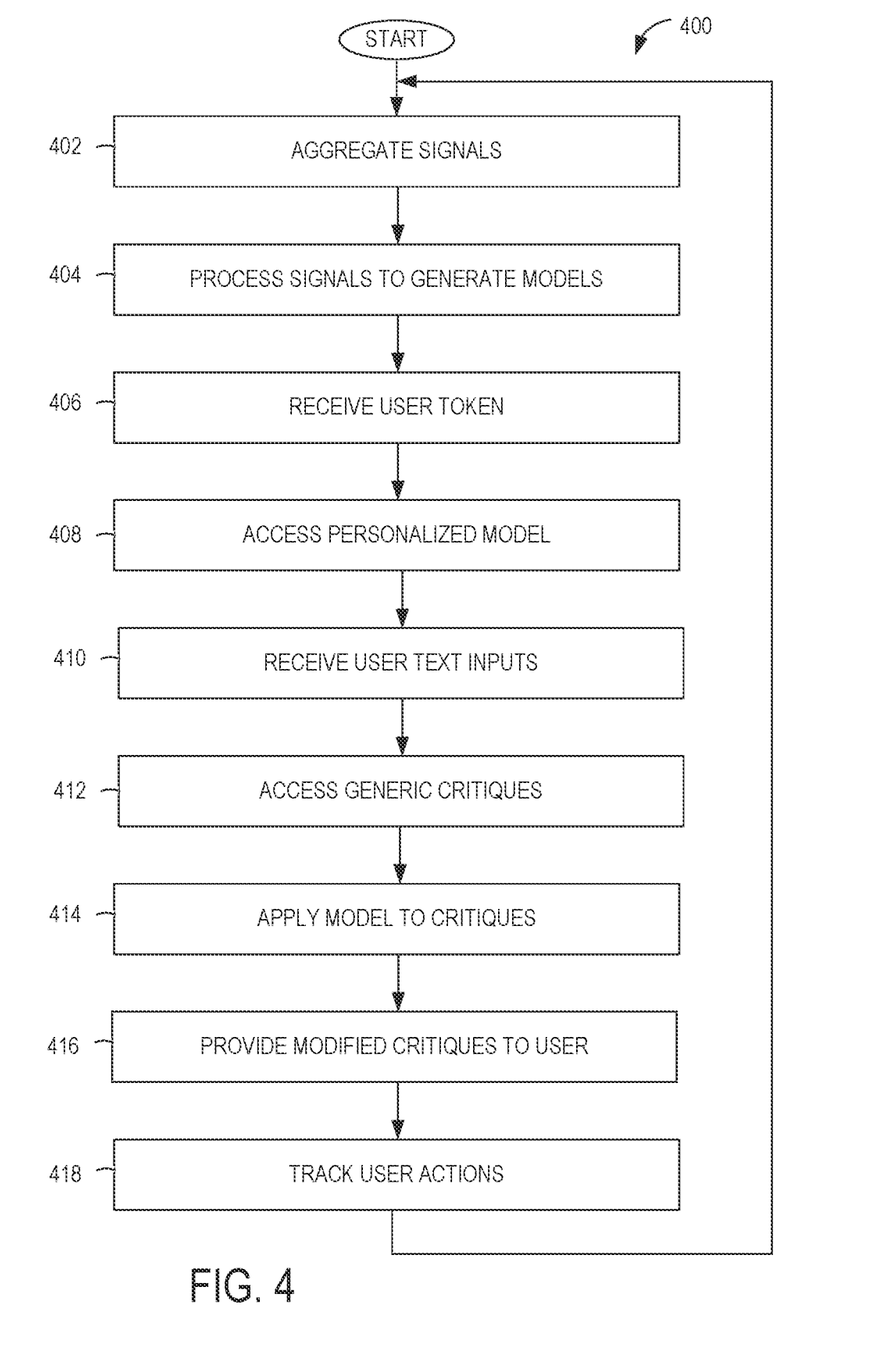
FIG. 4 is a flowchart illustrating operations of a method for providing personalized text proofing, according to some example embodiments.

FIG. 4 is a flowchart illustrating operations of a method 400 for providing personalized text proofing, according to some example embodiments. Operations in the method 400 may be performed by the augmentation system 106, editor system 110, and substrate platform 118 in the network environment 100 described above with respect to FIG. 1-FIG. 3. Accordingly, the method 400 is described by way of example with reference to these components in the network environment 100. However, it shall be appreciated that at least some of the operations of the method 400 may be deployed on various other hardware configurations or be performed by similar components residing elsewhere in the network environment 100 (e.g., at the client device 102). Therefore, the method 400 is not intended to be limited to these components.

In operation 402, user signals are aggregated and stored to the substrate platform 118. The user signals provide indications of the user's past active ignores or acceptance of critiques that were presented to the user. The critiques may include spelling and grammar suggestions that were generated by the editor system 110 and/or modified by the augmentation system 106 using a personalized user model.

In operation 404, the substrate platform 118 processes user signals for each user to generate personalized user models. In some embodiments, the analysis involves the use of heuristics and statistics, while in other embodiments, the analysis involves machine learning. The analysis may be at a user level, a tenant level, or a combination of both. The heuristic analysis is discussed in more detail in connection with FIG. 5 and FIG. 6 below.

With respect to the machine-learning analysis, the machine learning engine 214 takes, as input, the user signals from the user signal storage 202. Using these inputs, the machine learning engine 214 identifies patterns with respect to the critiques that are accepted or rejected. For example, the machine learning engine 214 can extract properties from the user signals (e.g., culture tag, flagged or typed text, replacement or meant text, sentence, and list suggestions) and uses these properties along with indications as to whether the critiques were accepted or ignored, as features to train a machine learning model for a user (e.g., an individual or tenant).

During runtime, the user at the client device 102 starts up an application (e.g., application 104) that utilizes proofing services. Upon startup, a user token may be received from the client device by the augmentation system 106 in operation 406. The user token uniquely identifies the user at the client device 102.

Using the user token, the augmentation system 106 accesses a corresponding user model from the substrate platform 118 in operation 408. In example embodiments, the augmentation system 106 (e.g., via the data interface 302) provides the user token to the substrate platform 118. In some embodiments, the user token is provided via an API call to the API 210 of the substrate platform 118. The API 210 uses the user token to retrieve the personalized user model for the user and returns the personalized user model to the augmentation system 106. The user model (e.g., a set of personalized NGrams from the substrate storage 206 or the machine learning model from the model storage 208) is received and locally cached in the service session in the personalized models storage 304 of the augmentation system 106. The user model may be for the user or for a tenant of which the user is a member of.

In operation 410, user text inputs are received from the user device 102 by the augmentation system 106. The augmentation system 106 passes the user text inputs to the editor system 110 to access a set of one or more generic critiques in operation 412. The editor system 110 returns the set of generic critiques to the augmentation system 106.

In operation 414, the augmentation system 106 applies the personalized user model to set of generic critiques. The application of the user model may result in one or more of the generic critiques being modified. That is, the user model can override a generic critique. For example, if the user has ignored a particular spelling suggestion a threshold number or percentage of times, the spelling suggestion may be modified to be suppressed. In another example, if the user model indicates that the user always replaces a particular user input (e.g., "typed" word) with a particular "meant" word, the corresponding generic critique will be modified to automatically correct (e.g., without any human intervention) the "typed" word with the particular "meant" word.

In operation 416, the modified set of critiques, which may include one or more modified critiques and one or more generic critiques (e.g., if no personalization is associated with the generic critiques) are provided to the user at the user device 102. Each critique may be suggested, automatically suppressed, or automatically applied (e.g., autocorrection). The user can actively ignore or accept each critique. The user actions with respect to the modified set of critiques (e.g., accept or ignore) are tracked (e.g., by the augmentation system 106) in operation 418. The tracking results in a new set of user signals that are aggregated at the substrate platform 118 and subsequently processed to update the user models.

The method 400 discussed above occurs in a web-based embodiment in which the augmentation system 106 modifies the generic critiques before transmission to the client device 102. Alternative embodiments may have the user device 102 performing the proofing service. In these embodiments, the user model and editor system capabilities are provided (e.g., downloaded) to the user device 102. The user device can then apply the user model to any generic critiques that are generated based on the user text inputs. Any active ignores or acceptances are captured, and the corresponding signals stored to the substrate platform 118 for subsequent analysis.

Figure 5:
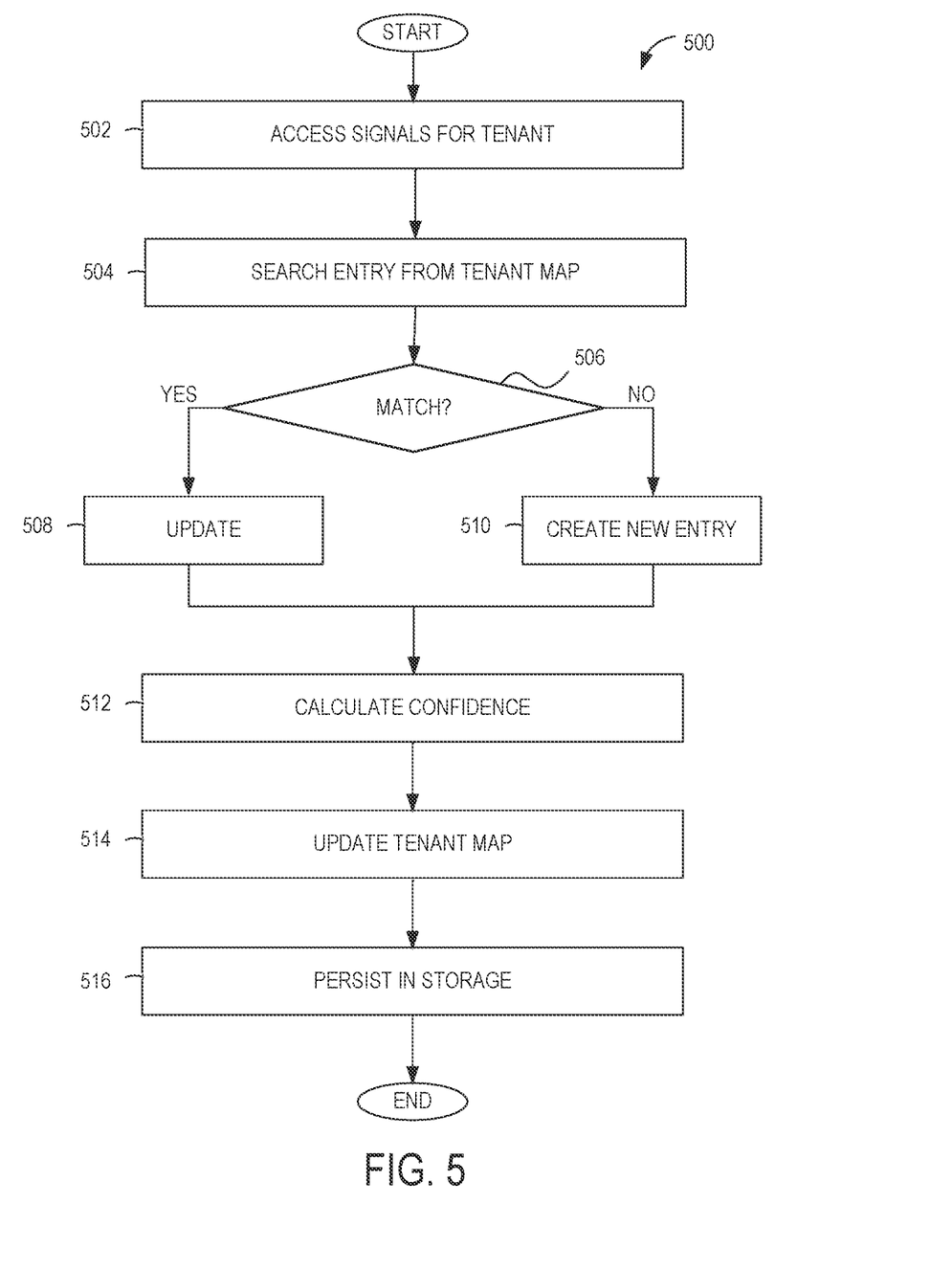
FIG. 5 is a flowchart illustrating operations of a method for processing signals and updating confidence for typed/meant pairs, according to some example embodiments.

FIG. 5 is a flowchart illustrating operations of a method 500 for processing signals and updating confidence for typed/meant pairs, according to some example embodiments. Operations in the method 500 may be performed by the substrate platform 118, using components described above with respect to FIG. 2. Accordingly, the method 500 is described by way of example with reference to the substrate platform 118. However, it shall be appreciated that at least some of the operations of the method 500 may be deployed on various other hardware configurations or be performed by similar components residing elsewhere in the network environment 100. Therefore, the method 500 is not intended to be limited to the substrate platform 118. The method 500 will be discussed in the context of spelling critiques. However, the method can also be used for processing signals for grammar critiques.

In operation 502, the heuristics engine 212 accesses user signals associated with a tenant. In some embodiments, each user signals may comprise a typed/meant pair of a critique that was accepted (or rejected) by users of the tenant.

In operation 504, the heuristics engine 212 searches for a matching entry for each typed/meant pair in a tenant speller map. The tenant speller map comprises an aggregation of individual user speller maps for a tenant (e.g., typed/meant pairs of users in the tenant). In some embodiments, the matching entry is based on a locale of the "typed" component in a sentence being satisfied (e.g., based on the sentence property). In example embodiments, the current tenant speller map comprises or indicates the personalized autocorrect word data 220 for the tenant that is stored in substrate storage (e.g., substrate storage 206).

In operation 506, a determination is made whether a matching typed/meant pair is found. If there is a match, then in operation 508, frequencies are updates. Specifically, if a matching typed/meant pair is found, the heuristics engine 212 increments the typed/meant pair's frequency by 1. Additionally, the user identifier of the user associated with the typed/meant pair is added to a list of unique user identifiers associated with the typed/meant pair and a user frequency of the user is updated for the typed/meant pair.

If there is no match in operation 506, then in operation 510, a new entry for the typed/meant pair is created in the tenant speller map. For example, a new entry is added to the tenant speller map with a frequency of 1 and user frequency (for the user) of 1.

In operation 512, a confidence for the typed/meant pair is calculated if conditions are satisfied. For example, the confidence is calculated if the frequency for the typed/meant pair is great than or equal to 1000 and/or the user frequency is greater than 100. The confidence can be calculated, for example, by the following equation: Confidence(Typed, Meant1)=(Meant1/(Meant1+Meant2+ . . . +MeantN))*100. Meant1 is the "meant" component of the typed/meant pair for which the confidence is being calculated, while Meant2 through MeantN are other components that have been paired with the same "typed" component.

In operation 514, the tenant speller map is updated with the calculated confidence and the tenant speller map is persisted in storage (e.g., the substrate storage 206) in operation 516. If confidence transgresses a confidence threshold, the spelling critique for the typed/meant pair may be automatically applied in the future for the tenant in accordance with some embodiments. However, in some embodiments, an individual's user model may trump the tenant user model.

Figure 6:
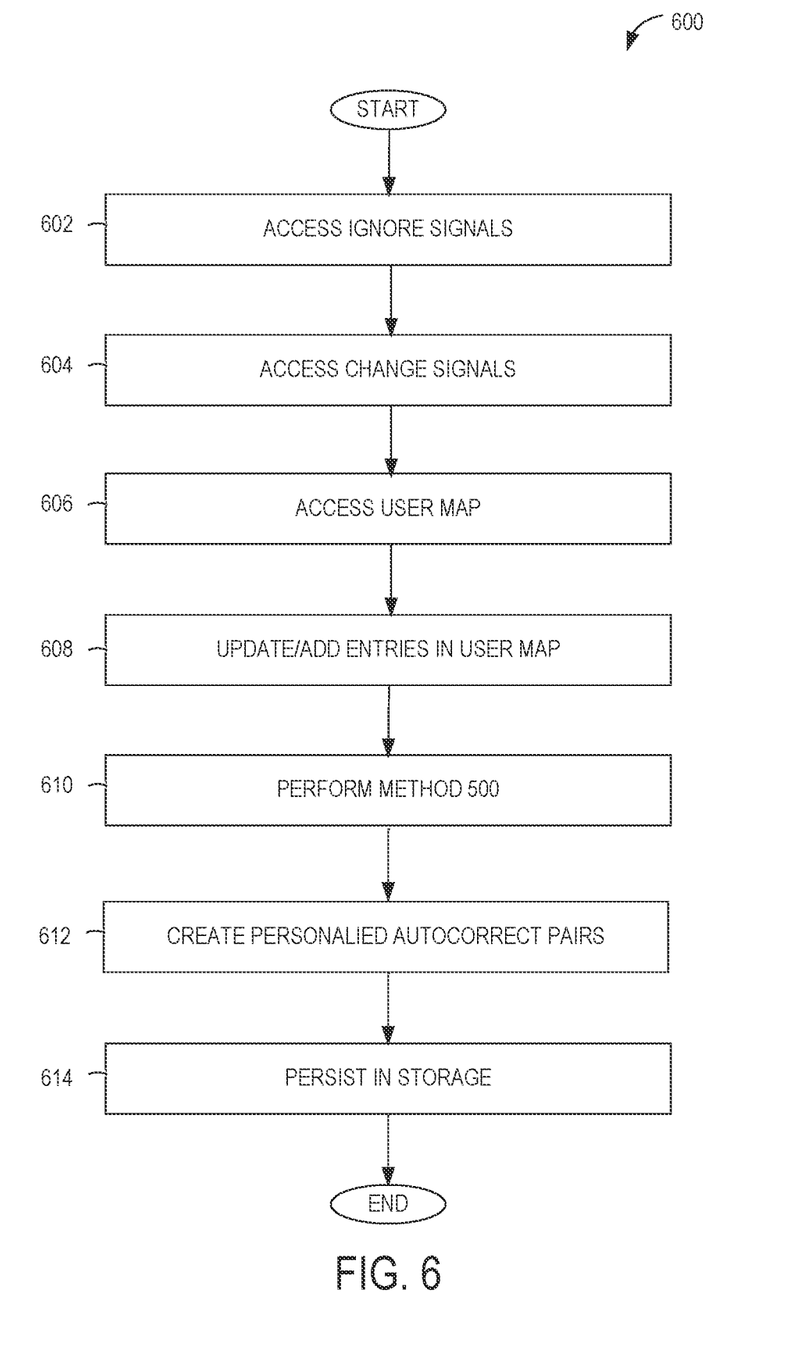
FIG. 6 is a flowchart illustrating operations of a method for processing signals to update user autocorrect type/meant pairs, according to some example embodiments.

FIG. 6 is a flowchart illustrating operations of a method 600 for processing signals to update a user (i.e., individual) autocorrect type/meant pairs, according to some example embodiments. Operations in the method 600 may be performed by the substrate platform 118, using components described above with respect to FIG. 2. Accordingly, the method 600 is described by way of example with reference to the substrate platform 118. However, it shall be appreciated that at least some of the operations of the method 600 may be deployed on various other hardware configurations or be performed by similar components residing elsewhere in the network environment 100. Therefore, the method 600 is not intended to be limited to the substrate platform 118. The method 600 will be discussed in the context of spelling critiques. However, the method can also be used for processing signals for grammar critiques.

In operation 602, the heuristics engine 212 accesses user ignore signals. In example embodiments, the heuristics engine 212 queries for user ignore signals (e.g., where the user ignores the spelling critique). The queries may be performed using API calls in one embodiment. Additionally, the queries may be limited to a particular period of time (e.g., the last 24 hours).

In operation 604, the heuristics engine 212 accesses user change signals. In example embodiments, the heuristics engine 212 queries for user change signals (e.g., where the user accepts the spelling critique or makes their own correction). The queries may be performed using API calls in one embodiment. Additionally, the queries may be limited to a particular period of time (e.g., the last 24 hours).

In operation 606, the heuristics engine 212 accesses a user speller map. In example embodiments, the user speller map comprises signals from the user signal storage 202 that have been previously processed prior to a current analysis by the heuristics engine 212 to generate the personalized ignore words data 216, the personalized ignore critiques data 218, and/or the personalized autocorrect word data 220 for the user that is stored in the substrate storage 206. For example, the user speller map comprises typed/meant pairs of a user.

In operation 608, the heuristics engine 212 updates/adds entries in the user speller map based on its analysis. For user ignore signals, the heuristics engine 212 searches the user speller map (e.g., personalized ignore words map) for a matching "typed" component of the user input. In some embodiments, the search also considers locale in a sentence (e.g., based on the sentence property). If a match is found, then the frequency for the match is incremented by 1. However, if no match is found, a new entry is added to the user speller map.

For the user change signals, the heuristics engine 212 may ignore processing the user signal in certain circumstances. For example, if the "typed" component contains non-word characters, the user signal is ignored. The remaining user signals are analyzed by searching for a typed/meant pair in the user speller map. If a matching entry is found, the frequency for the entry is incremented by 1. If a matching entry is not found, a new entry is added to the user speller map with a frequency of 1.

In some embodiments, the updated entries from operation 606 may be stored in a tenant level collection to update entries and confidences at the tenant level as discussed in method 500 of FIG. 5. As such, in operation 610, the operations of the method 500 may be performed.

In operation 612, personalized autocorrect (or auto-replace) pairs are created for the user. In some embodiments, the heuristics engine 212 access the user speller map. In some embodiments, the heuristics engine 212 may also access a tenant speller map. The heuristics engine 212 searches for entries from the user speller map in the tenant speller map. If an entry is found and a condition satisfied, the type/meant pair may be designated for automatic application (e.g., added to the personalized autocorrect words storage 220; add to a user confidence map). For example, if a tenant confidence is equal to or great than 95, a tenant frequency is equal to or greater than 1000, and/or a user frequency of the user is equal to or greater than 100, then the type/meant pair will be automatically applied. In operation 614, results are persisted in storage.

Figure 7:
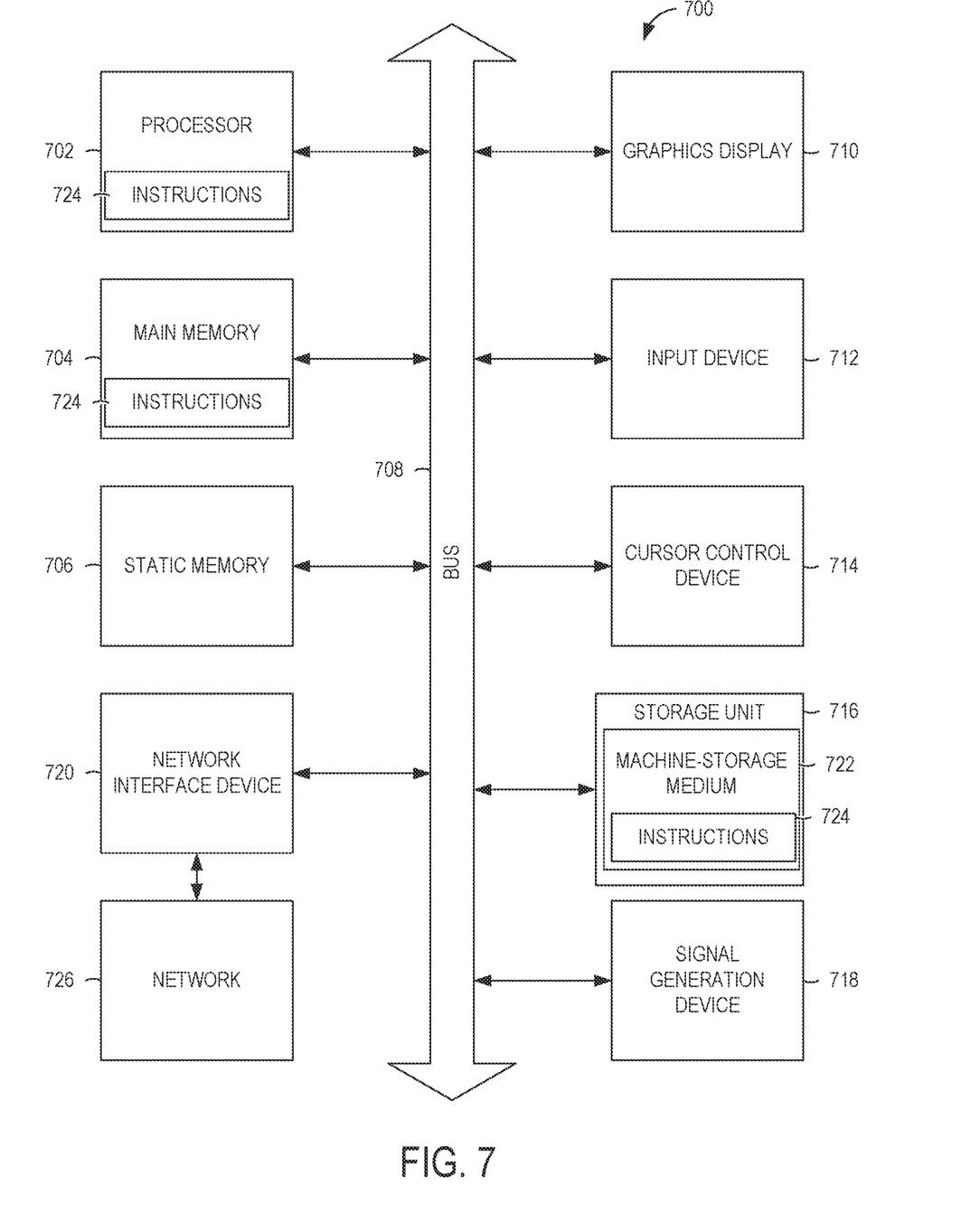
FIG. 7 is a block diagram illustrating components of a machine, according to some example embodiments, able to read instructions from a machine-storage medium and perform any one or more of the methodologies discussed herein.

FIG. 7 illustrates components of a machine 700, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIG. 4 to FIG. 6. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing personalized text proofing. The method is performed by one or more hardware processors and comprises generating, based on user signals indicating past actions of a user, a user model that is used to personalize generic critiques used for text proofing a document; during runtime of an application on a user device used to create the document, accessing and locally caching the user model; receiving user inputs comprising typed components used to create the document; accessing, from an editor system, a set of one or more generic critiques for the user inputs; applying, by one or more hardware processors, the user model to the set, the applying comprising modifying a generic critique of the set based on the user model, the modifying causing the generic critique to be automatically applied or suppressed at the client device; and transmitting the set including the modified generic critique to the user device, the user device applying the set to the document including automatically applying or suppressing the modified generic critique.

In example 2, the subject matter of example 1 can optionally include monitoring user explicit accepts and ignores of the set at the client device, and aggregating the explicit accepts and ignores as further user signals indicating past actions of the user, the further user signals used to update the user model.

In example 3, the subject matter of any of examples 1-2 can optionally include receiving a user token from the user device, the accessing the user model comprising making an application programing interface (API) call to a system that generates the user model to retrieve the user model using the user token.

In example 4, the subject matter of any of examples 1-3 can optionally include wherein generating the user model comprises machine training, by a machine training engine, the user model, the machine training comprising identifying patterns based on accepted and rejected critiques of typed/meant pairs, each typed/meant pair comprising a typed component of a user input and a corresponding replacement component to replace the typed component.

In example 5, the subject matter of any of examples 1-4 can optionally include wherein generating the user model comprises for each user signal, searching for a matching typed/meant pair in a tenant map; and incrementing a frequency for each typed/meant pair found in the tenant map.

In example 6, the subject matter of any of examples 1-5 can optionally include wherein generating the user model comprises for each user signal, searching for a matching typed/meant pair in a tenant map; incrementing a user frequency for the user for each typed/meant pair found in the tenant map; and incrementing a count of unique users associated with each matching typed/meant pair.

In example 7, the subject matter of any of examples 1-6 can optionally include wherein generating the user model comprises calculating a confidence for each typed/meant pair for each user, wherein a confidence that exceeds a confidence threshold causes a critique associated with typed/meant pair to be automatically applied or suppressed.

In example 8, the subject matter of any of examples 1-7 can optionally include wherein generating the user model comprises accessing a user ignore signal, the user ignore signal indicating user rejection of a corresponding critique; searching a user speller map for a matching typed component associated with the user ignore signal; and incrementing a frequency for the matching typed component in the user speller map.

In example 9, the subject matter of any of examples 1-8 can optionally include wherein generating the user model comprises accessing a user change signal, the user change signal indicating user acceptance of a corresponding critique; searching a user speller map for a matching typed component associated with the user change signal; and incrementing a frequency for the matching typed component in the user speller map.

In example 10, the subject matter of any of examples 1-9 can optionally include wherein generating the user model comprises designating type/meant pairs for automatic application, the designating being based on a tenant frequency associated with the type meant pair meeting or exceeding a frequency threshold.

In example 11, the subject matter of any of examples 1-10 can optionally include wherein generating the user model comprises designating type/meant pairs for automatic application, the designating being based on a user frequency associated with the type meant pair meeting or exceeding a frequency threshold.

Example 12 is a system for providing personalized text proofing. The system comprises one or more hardware processors and a memory storing instructions that, when executed by the one or more hardware processors, cause the one or more hardware processors to perform operations comprising generating, based on user signals indicating past actions of a user, a user model that is used to personalize generic critiques used for text proofing a document; during runtime of an application on a user device used to create the document, accessing and locally caching the user model; receiving user inputs comprising typed components used to create the document; accessing, from an editor system, a set of one or more generic critiques for the user inputs; applying the user model to the set, the applying comprising modifying a generic critique of the set based on the user model, the modifying causing the generic critique to be automatically applied or suppressed at the client device, and transmitting the set including the modified generic critique to the user device, the user device applying the set to the document including automatically applying or suppressing the modified generic critique.

In example 13, the subject matter of example 12 can optionally include wherein the operations further comprise monitoring user explicit accepts and ignores of the set at the client device; and aggregating the explicit accepts and ignores as further user signals indicating past actions of the user, the further user signals used to update the user model.

In example 14, the subject matter of any of examples 12-13 can optionally include wherein the operations further comprise receiving a user token from the user device, the accessing the user model comprising making an application programing interface (API) call to a system that generates the user model to retrieve the user model using the user token.

In example 15, the subject matter of any of examples 12-14 can optionally include wherein generating the user model comprises machine training, by a machine training engine, the user model, the machine training comprising identifying patterns based on accepted and rejected critiques of typed/meant pairs, each typed/meant pair comprising a typed component of a user input and a corresponding replacement component to replace the typed component.

In example 16 the subject matter of any of examples 12-15 can optionally include wherein generating the user model comprises accessing a user change signal, the user change signal indicating user acceptance of a corresponding critique; searching a user speller map for a matching typed component associated with the user change signal, and incrementing a frequency for the matching typed component in the user speller map.

In example 17, the subject matter of any of examples 12-16 can optionally include wherein generating the user model comprises calculating a confidence for each typed/meant pair for each user, wherein a confidence that exceeds a confidence threshold causes a critique associated with typed/meant pair to be automatically applied or suppressed.

In example 18, the subject matter of any of examples 12-17 can optionally include wherein generating the user model comprises designating type/meant pairs for automatic application, the designating being based on a tenant frequency associated with the type meant pair meeting or exceeding a frequency threshold.

In example 19, the subject matter of any of examples 12-18 can optionally include wherein generating the user model comprises designating type/meant pairs for automatic application, the designating being based on a user frequency associated with the type meant pair meeting or exceeding a frequency threshold.

Example 20 is a computer-storage medium comprising instructions which, when executed by one or more hardware processors of a machine, cause the machine to perform operations for providing personalize text proofing. The operations comprise generating, based on user signals indicating past actions of a user, a user model that is used to personalize generic critiques used for text proofing a document; during runtime of an application on a user device used to create the document, accessing and locally caching the user model; receiving user inputs comprising typed components used to create the document; accessing, from an editor system, a set of one or more generic critiques for the user inputs; applying the user model to the set, the applying comprising modifying a generic critique of the set based on the user model, the modifying causing the generic critique to be automatically applied or suppressed at the client device; and transmitting the set including the modified generic critique to the user device, the user device applying the set to the document including automatically applying or suppressing the modified generic critique.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    generating, based on user signals indicating past actions of a user, a user model that is used to personalize generic critiques used for text and grammar proofing a document, the generating the user model including generating mappings of personalized autocorrect words, the generating the mappings comprising:
        searching for entries from a user speller map in a tenant speller map of a group of users of which the user is a member, the tenant speller map comprising an aggregation of user speller maps of the group; and
        based on finding an entry from the user speller map in the tenant speller map and based on a condition being satisfied, adding a type/meant pair corresponding to the entry to the mapping of personalized autocorrect words;
    during runtime of an application on a client device used to create the document, receiving, by an augmentation system that acts as an intermediate between the client device and an editor system, a user token from the client device;
    using the user token, accessing and locally caching the user model at the augmentation system;
    receiving, from the client device by the augmentation system, user inputs comprising typed components used to create the document;
    accessing, from the editor system by the augmentation system, a set of one or more generic critiques for the user inputs, the accessing comprising calling the editor system with the user inputs received from the client device and receiving the set from the editor system in response;
    applying, by one or more hardware processors of the augmentation system, the user model to the set received from the editor system, the applying comprising overriding one or more generic critiques of the set based on the user model to generate a modified set of critiques, the modified set of critiques including generic critiques and the one or more overridden generic critiques; and
    transmitting, over a network by the augmentation system, the modified set of critiques to be automatically applied or suppressed to the client device, the client device applying the modified set to the document.

2. The method of claim 1, further comprising:
    monitoring user explicit accepts and ignores of the modified set of critiques at the client device; and
    aggregating the explicit accepts and ignores as further user signals indicating past actions of the user, the further user signals used to update the user model.

3. The method of claim 1, wherein generating the user model comprises machine training, by a machine training engine, the user model, the machine training comprising identifying patterns based on accepted and rejected critiques of typed/meant pairs, each typed/meant pair comprising a typed component of a user input and a corresponding replacement component to replace the typed component.

4. The method of claim 1, wherein generating the user model comprises:
    for each user signal, incrementing a frequency for each typed/meant pair found in the tenant map.

5. The method of claim 1, wherein generating the user model comprises:
    for each user signal, incrementing a user frequency for the user for each typed/meant pair found in the tenant map; and
    incrementing a count of unique users associated with each matching typed/meant pair.

6. The method of claim 1, wherein generating the user model comprises:
    calculating a confidence for each typed/meant pair for each user, wherein a confidence that exceeds a confidence threshold causes a critique associated with typed/meant pair to be automatically applied or suppressed.

7. The method of claim 1, wherein generating the user model comprises:
    accessing a user ignore signal, the user ignore signal indicating user rejection of a corresponding critique;
    searching the user speller map for a matching typed component associated with the user ignore signal; and
    incrementing a frequency for the matching typed component in the user speller map.

8. The method of claim 1, wherein generating the user model comprises:
    accessing a user change signal, the user change signal indicating user acceptance of a corresponding critique;
    searching the user speller map for a matching typed component associated with the user change signal; and
    incrementing a frequency for the matching typed component in the user speller map.

9. The method of claim 1, wherein the condition comprises a tenant frequency or user frequency associated with the type meant pair meeting or exceeding a frequency threshold.

10. The method of claim 1, wherein the condition comprises a tenant confidence score associated with the type meant pair meeting or exceeding a confidence threshold.

11. A system comprising:
one or more hardware processors; and
a memory storing instructions that, when executed by the one or more hardware processors, cause the one or more hardware processors to perform operations comprising:
generating, based on user signals indicating past actions of a user, a user model that is used to personalize generic critiques used for text and grammar proofing a document, the generating the user model including generating mappings of personalized autocorrect words, the generating the mappings comprising:
searching for entries from a user speller map in a tenant speller map of a group of users of which the user is a member, the tenant speller map comprising an aggregation of user speller maps of the group; and
based on finding an entry from the user speller map in the tenant speller map and based on a condition being satisfied, adding a type/meant pair corresponding to the entry to the mapping of personalized autocorrect words;
during runtime of an application on a client device used to create the document, receiving, by an augmentation system that acts as an intermediate between the client device and an editor system, a user token from the client device;
using the user token accessing and locally caching the user model at the augmentation system;
receiving, from the client device by the augmentation system, user inputs comprising typed components used to create the document;
accessing, from the editor system by the augmentation system, a set of one or more generic critiques for the user inputs, the accessing comprising calling the editor system with the user inputs received from the client device and receiving the set from the editor system in response;
applying the user model to the set received from the editor system, the applying comprising overriding one or more generic critique of the set based on the user model to generate a modified set of critiques, the modified set of critiques including generic critiques and the one or more overridden generic critiques; and
transmitting, over a network by the augmentation system, the modified set of critiques to be automatically applied or suppressed to the client device, the client device applying the modified set to the document.

12. The system of claim 11, wherein the operations further comprise:
monitoring user explicit accepts and ignores of the modified set of critiques at the client device; and
aggregating the explicit accepts and ignores as further user signals indicating past actions of the user, the further user signals used to update the user model.

13. The system of claim 11, wherein generating the user model comprises machine training, by a machine training engine, the user model, the machine training comprising identifying patterns based on accepted and rejected critiques of typed/meant pairs, each typed/meant pair comprising a typed component of a user input and a corresponding replacement component to replace the typed component.

14. The system of claim 11, wherein generating the user model comprises:
accessing a user change signal, the user change signal indicating user acceptance of a corresponding critique;
searching the user speller map for a matching typed component associated with the user change signal; and
incrementing a frequency for the matching typed component in the user speller map.

15. The system of claim 11, wherein generating the user model comprises:
calculating a confidence for each typed/meant pair for each user, wherein a confidence that exceeds a confidence threshold causes a critique associated with typed/meant pair to be automatically applied or suppressed.

16. The system of claim 11, wherein the condition comprises a tenant frequency or user frequency associated with the type meant pair meeting or exceeding a frequency threshold.

17. The system of claim 11, wherein the condition comprises a tenant confidence score associated with the type meant pair meeting or exceeding a confidence threshold.

18. A computer-storage medium comprising instructions which, when executed by one or more hardware processors of a machine, cause the machine to perform operations comprising:
generating, based on user signals indicating past actions of a user, a user model that is used to personalize generic critiques used for text and grammar proofing a document, the generating the user model including generating mappings of personalized autocorrect words, the generating the mappings comprising:
searching for entries from a user speller map in a tenant speller map of a group of users of which the user is a member, the tenant speller map comprising an aggregation of user speller maps of the group; and
based on finding an entry from the user speller map in the tenant speller map and based on a condition being satisfied, adding a type/meant pair corresponding to the entry to the mapping of personalized autocorrect words;
during runtime of an application on a client device used to create the document, receiving, by an augmentation system that acts as an intermediate between the client device and an editor system, a user token from the client device;
using the user token, accessing and locally caching the user model at the augmentation system;
receiving, from the client device by the augmentation system, user inputs comprising typed components used to create the document;
accessing, from the editor system by the augmentation system, a set of one or more generic critiques for the user inputs, the accessing comprising calling the editor system with the user inputs received from the client device and receiving the set from the editor system in response;
applying the user model to the set received from the editor system, the applying comprising overriding one or more generic critiques of the set based on the user model to generate a modified set of critiques, the modified set of critiques including generic critiques and the one or more overridden generic critiques; and transmitting, over a network by the augmentation system, the modified set of critiques to be automatically applied or suppressed to the client device, the client device applying the modified set to the document.

* * * * *